UNITED STATES PATENT OFFICE

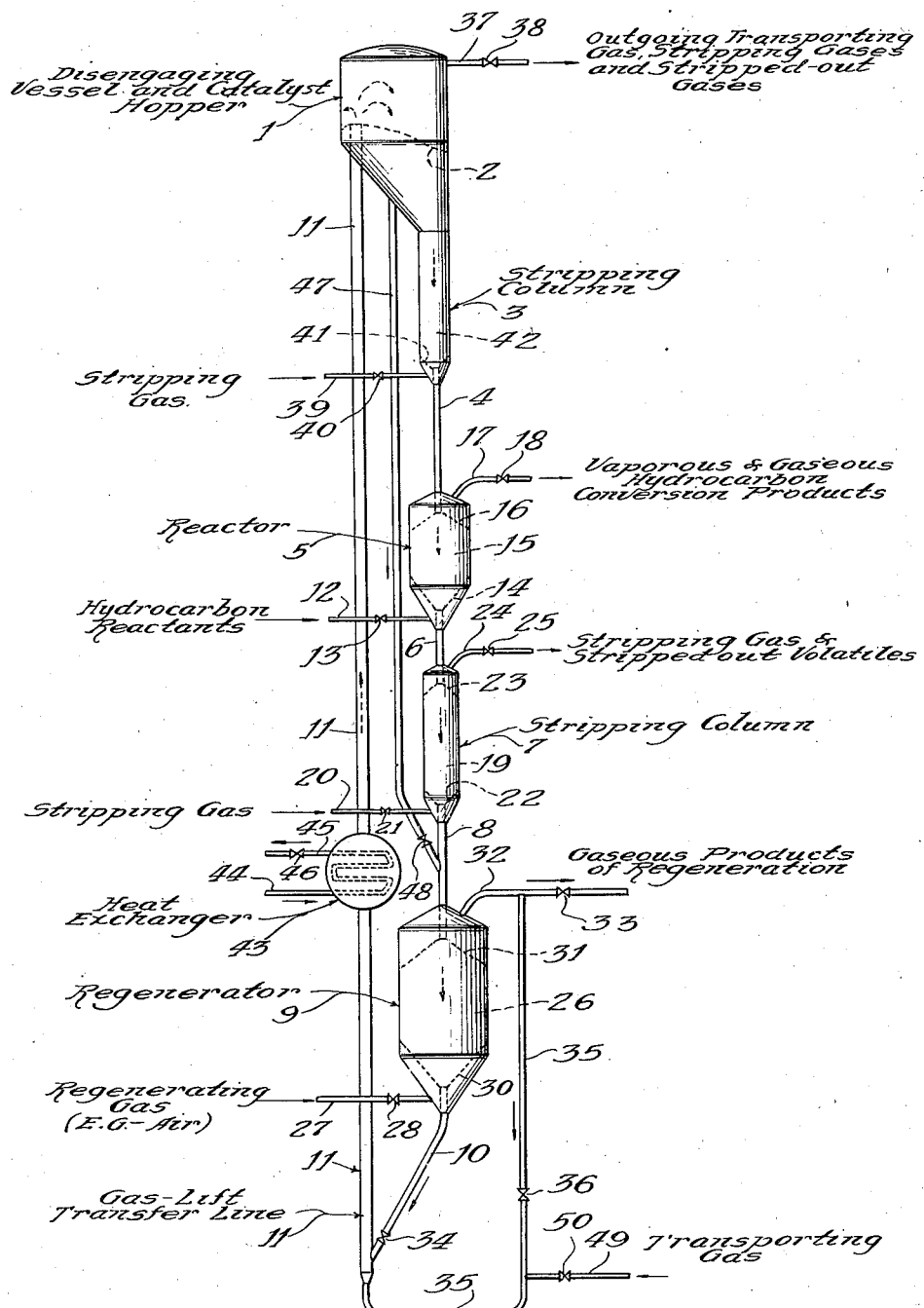

2,414,373

CONVERSION OF FLUID REACTANTS

Clarence G. Gerhold, Chicago, Ill., assignor to Universal Oil Products Company, Chicago, Ill., a corporation of Delaware Application April 12, 1944, Serial No. 530,641

5 Claims. (Cl. 196—52)

The invention is directed to an improved method and means for effecting the conversion of fluid reactants in the presence of a mass of subdivided solid contact material or catalyst which accumulates deleterious products of the reaction and is regenerated by removal of the contaminants.

The system provided is of the general type in which the conversion reaction and regeneration are accomplished simultaneously in separate confined reaction and regenerating zones through which the catalyst or contact material is continuously circulated. It is further characterized in that a relatively compact bed of the solid particles is maintained in the reaction zone and in the regenerating zone. The fluid reactants to be converted and resulting fluid conversion products are passed upwardly through the bed in the reaction zone while the solid particles of catalyst or contact material pass downwardly through the bed and a similar counter-current flow between the solid particles and the regenerating fluid employed and resulting fluid products of regeneration is utilized in the regenerating zone.

The features of the invention will be found advantageous as applied to a wide variety of reactions involving the sequential contact of subdivided solid material with different fluids. Therefore, in its broader aspects the invention is not otherwise limited with respect to the particular class of operation conducted. Also, in its broad aspects the process may employ solid contact material which is either relatively inert in directing or promoting the reaction or has a catalytic influence thereon or is a reagent which enters into the reaction. However, the invention is more particularly directed to the catalytic conversion of fluid hydrocarbons by such reactions as cracking, reforming, dehydrogenation, aromatization or dehydrocyclization and the like. Operating conditions of temperature, pressure, contact time and the like, as well as solid catalysts suitable for promoting the desired reaction, are well known to those familiar with the art and therefore need not be recited here in detail. The invention is more particularly concerned with the method and means provided for effecting circulation of the catalyst or contact material through the system and in the general form and arrangement of the equipment employed. A description of the invention as applied to the catalytic cracking of hydrocarbon oil will serve to illustrate its features and advantages. The subsequent description will, therefore, be directed principally to this type of operation and the applicability of the features of the invention to other operations of the general class above mentioned will be readily apparent to those familiar with the art.

One of the primary objects of the invention is to provide a process and apparatus of the general class above mentioned in which the solid particles of catalyst or contact material flow downwardly by gravity in series through the several contacting zones counter-current to the fluids with which they are contacted therein. A further object is to provide such an operation in which the kinetic energy of the outgoing fluid from one of the contacting zones is utilized to advantage by employing the fluid as a transporting medium for returning solid particles from the lower zone of the series to a relatively high point in the system from which they will flow by gravity back through the contacting zones.

As applied to the catalytic cracking of hydrocarbon oil, the aforementioned objects of the invention may be achieved, for example, by providing a disengaging vessel and catalyst hopper in which the circulating catalyst particles are separated from the transporting fluid and in which a relatively compact mass of the catalyst particles is accumulated, providing a reaction vessel communicating with said hopper and disposed therebeneath to which the hydrocarbon reactants to be converted are supplied and therein contacted with a relatively compact bed of the catalyst to effect their conversion, providing a regenerating vessel communicating with and disposed beneath the reactor and to which air or other oxidizing gas is supplied and passed in contact with the bed of the catalyst in this zone to burn combustibles therefrom, removing gaseous products of the regenerating step from the bed in the regenerating zone and from the latter, separately removing regenerated catalyst particles from the lower portion of the bed in the regenerating zone, suspending the same in a stream of transporting gas comprising at least a portion of said gaseous products of regeneration and directing the suspension upwardly by the gas-lift action of the transporting fluid into the aforesaid disengaging vessel and hopper. The invention also contemplates the use of stripping vessels at appropriate locations in the catalyst circuit above described for substantially purging occluded and adsorbed volatile hydrocarbons from the catalyst passing from the reactor to the regenerator and for substantially purging the occluded and adsorbed oxidizing gas and combustion gases from the stream of catalyst particles being transferred from the regenerator to the reactor.

The aforementioned and other features of the invention will be described in more detail with reference to the accompanying diagrammatic drawing.

The drawing is an elevational view of one specific form of apparatus in which the improved process provided by the invention may be conducted.

Referring to the drawing, the apparatus here illustrated comprises a disengaging vessel and catalyst hopper 1 wherein transporting gas and suspended catalyst particles, supplied thereto as will be later described, are substantially separated and wherein a relatively compact mass of the catalyst particles is accumulated. The approximate upper extremity of the catalyst mass or bed in vessel 1 is indicated by the broken line 2. An uninterrupted relatively dense or compact column of catalyst particles extends downwardly from the mass or bed in vessel 1 through the stripping column 3, conduit 4, the reaction vessel 5, conduit 6, stripping column 7, conduit 8, the regenerating vessel 9 and conduit 10 into the gas-lift transfer line 11 wherein solid particles which have passed downwardly through the sequence of lines and vessels above mentioned are suspended in a stream of transporting gas and returned therein to the disengaging vessel and hopper 1 to complete the main catalyst circuit through the system.

In operating the process for the catalytic cracking of hydrocarbon oil, the latter is supplied to the lower portion of reactor 5 through line 12 and valve 13, preferably in essentially vaporous state, and the oil vapors are directed upwardly through a suitable perforate distributing member 14 into the relatively compact bed of downwardly moving catalyst particles 15 supported by member 14. Suitable cracking conditions of temperature, pressure and space velocity are maintained within the reaction zone to effect the desired cracking of the hydrocarbon reactants as they pass upwardly through bed 15. The term "space velocity" as here used may be defined as pounds of hydrocarbon reactants supplied to the reaction zone per hour, per pound of catalyst present in the reaction zone.

The approximate upper extremity of bed 15 in the reactor is indicated by the broken line 16 and the vaporous and gaseous hydrocarbon conversion products are discharged from the bed into the space provided between the upper extremity of the bed and the upper end of the reaction vessel. These products are discharged from the reactor through line 17 and valve 18, preferably to fractionating and recovery equipment of any desired conventional form which does not constitute a novel part of the system and is, therefore, not illustrated. In case any substantial quantity of catalyst fines remain entrained in the vapor-gas stream discharged from the reactor through line 17 they may be separated therefrom and recovered by passing the stream through suitable equipment, not illustrated, such as one or more centrifugal or cyclone separators, an electrical precipitator, a scrubber or the like. This also applies to the recovery of catalyst fines from any of the other outgoing vapor and/or gas streams discharged from the several vessels.

As previously indicated, the perforate member 14 in the reactor serves as a distributing grid for substantially uniformly distributing the incoming hydrocarbon reactants over the horizontal cross-sectional area of the catalyst bed in the reactor and serves also as a screen having sufficiently small openings to prevent the solid particles from passing therethrough. The catalyst particles pass downwardly over member 14 into conduit 6 through which they flow into another relatively dense bed 19 maintained within stripping column 7. Here the catalyst particles from the reactor, which have accumulated deleterious contaminants which must be burned therefrom in the regenerator to restore the desired activity to the catalyst, are substantially stripped of occluded and adsorbed volatile hydrocarbons in order to prevent the passage of these more valuable fractions into the regenerator where they would be burned with the heavy contaminants. To accomplish this suitable stripping gas, such as steam, carbon dioxide, nitrogen or other relatively inert gas, is supplied to the lower portion of the stripping column through line 20 and valve 21 and is directed upwardly through the perforate distributing member 22, similar in form and function to that of member 14 in the reactor, into and upwardly through bed 19 to strip out volatile hydrocarbons from the bed.

The approximate upper extremity of the bed 19 in stripping column 7 is indicated by the broken line 23 and the stripping gas and stripped-out volatiles are discharged from the space provided between the upper extremity of bed 19 and the upper end of stripping column 7 through line 24 and valve 25. This outgoing stream may conveniently be supplied, when desired, to the same fractionating and recovery equipment above mentioned to which the vapor gas stream from the reactor is supplied so that the stripped-out volatile hydrocarbons may be recovered with similar fractions of the conversion products removed from the reactor through line 17.

The stream or column of catalyst particles continues downwardly from the bed 19 in stripping column 7 through conduit 8 into the relatively compact catalyst bed 26 maintained within regenerator 9. Here deleterious combustibles accumulated in the reaction step are burned from the catalyst by passing oxidizing gas upwardly into bed 26 in contact with and countercurrent to the downwardly moving catalyst particles comprising the bed. The regenerating gas employed, which may comprise, for example, air or air diluted with relatively inert or non-combustible gas is supplied to the lower portion of the regenerator through line 27 and valve 28, entering the vessel beneath the perforate member and screen 30, and is passed upwardly through the latter into bed 26. Member 30 is also similar in form and function to member 14 in the reactor.

The approximate upper extremity of the catalyst bed in the regenerator is indicated by the broken line 31 and the gaseous products of combustion, resulting from regeneration of the catalyst, are discharged from the space provided in the regenerator between its upper end and the upper extremity of bed 26 through line 32. That portion, if any, of the gases thus discharged from the regenerator, which is not required for transporting the regenerated catalyst back to vessel 1, as will be later described, may be discharged from the system through valve 33 in line 32 to suitable heat recovery equipment or the like, not illustrated, which may be provided in this line for the recovery of readily available heat energy from the hot combustion gases.

The catalyst which has undergone regeneration in regenerator 9 is directed from the lower portion of bed 26 downwardly through conduit 10 and the adjustable orifice or flow control valve 34 provided adjacent the lower end of this conduit into the gas-lift transfer line 11. Here the regenerated catalyst particles meet and are suspended in a stream of transporting gas which, in the case illustrated, may comprise all or a regulated portion of the gaseous products of regeneration previously discharged from the regenerator. The gaseous products of regeneration are supplied to transfer line 11 from line 32 through line 35 and valve 36. The transporting gas serves to increase the velocity and reduce the catalyst particle concentration or density of the stream passing through transfer line 11, so that the hydrostatic pressure in line 11 at the point where the catalyst particles enter the same is materially less than the hydrostatic pressure on the upstream side of valve 34 in the more dense catalyst column passing through the vessels 1, 3, 5, 7, 9 and the communicating lines 4, 6, 8 and 10. Thus, the catalyst particles are transported upwardly through line 11 by the gas-lift action of the outgoing regenerating gas and the required kinetic energy of the transporting gas may be obtained by maintaining a higher gas pressure at the outlet end of the regenerator and in lines 32 and 35 than that maintained in the disengaging vessel 1 to which the catalyst is transported. In any case, the pressure of the transporting gas entering transfer line 11 is sufficiently greater than the gas pressure in vessel 1 to overcome the pressure drop through line 11 and carry the catalyst particles therethrough, but is somewhat less than the hydrostatic pressure on the upstream side of valve 34.

Vessel 1 may, when desired, be open at its upper end to the atmosphere so that the pressure in this zone is substantially atmospheric, or a slight superatmospheric pressure may be employed in this zone and the gases which have been disengaged from the catalyst particles therein are discharged from the vessel through line 37, controlled by valve 38. This outgoing gas stream will comprise transporting gas utilized in transfer line 11 and stripping gas utilized, as will be later described, in stripping column 3. Separation of all or substantially all of the catalyst particles from the gases in vessel 1 is effected, in the case illustrated, by gravitation of the solid particles, the velocity of the gases being reduced in the enlarged upper section of vessel 1 to such an extent that they will not overcome the force of gravity on the solid particles and the latter will settle from the gases.

The separated regenerated catalyst accumulated within the hopper-like bottom section of vessel 1 may retain occluded and adsorbed transporting gas and stripping column 3 is provided, in the case illustrated, as a zone in which all or a substantial portion of these occluded and adsorbed gases are stripped or purged from the catalyst to prevent their introduction into the reactor. To accomplish this, stripping gas of the nature previously mentioned in connection with the operation of stripper 7 is supplied to the lower portion of stripping column 3 through line 39 and valve 40, entering this zone beneath the perforate distributing grid and screen 41 which is similar in form and function to member 14 in the reactor. The stripping gas flows upwardly through member 41 and the column of downwardly moving catalyst particles in the stripping zone to displace other gases. Stripping fluid and stripped-out gases pass from the upper extremity 2 of the mass of catalyst in hopper 1 to commingle with the transporting gas from line 11 and to be discharged therewith through line 37 and valve 38.

In case it is desired to remove the stripping fluid and stripped-out gases from column 3 separate from the transporting fluid supplied to vessel 1, stripping column 3 may be separate from vessel 1 with a standpipe from the latter extending downwardly to the bed in the stripping column in the same manner as conduit 6 extends into stripping column 7. Thus, stripping gas and stripped-out gases may be separately removed from column 3 through the space provided therein beneath the upper extremity of the bed maintained in this zone and the upper end of the stripping column.

The catalyst particles flow downwardly from the bed 42 thereof maintained in stripping column 3 through conduit 4 into the upper portion of the bed 15 in reactor 5 where they are again used to promote the cracking reaction, as previously described.

Provision is made, in the case here illustrated, for cooling the catalyst being returned from the regenerator to the reactor in order to maintain the desired average temperature in the bed 15 in the reactor and so that a considerably higher temperature may be employed in the regenerator, as is usually desirable. To accomplish this a heat exchanger 43 is interposed in the gas-lift transfer line 11 and a suitable cooling medium, such as water, steam, hot oil, molten salt or the like, is circulated through the heat exchanger in indirect contact and heat transfer relation with the stream of commingled catalyst particles and transporting fluid passing therethrough. The cooling fluid is supplied to heat exchanger 43 through line 44 and is discharged at an increased temperature through line 45 at a rate controlled by valve 46.

It is, of course, possible and within the scope of the invention to interpose a heat exchanger or catalyst cooler similar to 43 in conduit 4 or in conduit 10 or at any other desired point in the path of flow of the catalyst passing from the regenerator back to the reactor or to provide heat exchange means within the regenerator. However, by providing equipment for cooling the catalyst in the gas-lift transfer line 11, it will also serve to recover heat from the outgoing gaseous products of regeneration. Also, when a catalyst cooler is provided in line 11, or in line 10 or vessel 1, cooled catalyst may be withdrawn from vessel 1 and returned directly and in regulated quantities to the upper portion of bed 26 in the regenerator so as to prevent the development of an excessively high temperature in this zone which would result in damage or permanent impairment to the activity of the catalyst. In the case illustrated, provision is made for withdrawing cooled catalyst from vessel 1 and directing the same through conduit 47 and the adjustable orifice or flow control valve 48, provided at the lower end thereof, into conduit 8 to commingle with and reduce to the desired degree the temperature of the main catalyst stream entering the regenerator.

In its broader aspects it is not essential to use all of the features of the invention above described in combination. For example, a transporting medium other than gaseous products of regeneration may be employed in transfer line 11 in addition to or instead of gases discharged from the regenerator. Provision is made in the case illustrated for supplying other transporting gas to line 11 via line 49, valve 50 and line 35. This may comprise, for example, steam or other relatively inert or non-combustible gas, substantially non-oxidizing gas, such as combustion gases produced outside the regenerator and relatively low in free oxygen and carbon monoxide content, or it may comprise oxidizing gas, such as air, which may, when desired, be subsequently used to support combustion in the regenerator. In the latter case (i. e., when air or other oxidizing gas from an external source is employed as the transporting fluid in line 11) it may be supplied, after being disengaged from the catalyst in vessel 1, to the lower portion of regenerator 9 by a suitable connecting conduit, not illustrated.

The invention also contemplates omission of the catalyst cooler 43 or equipment serving a similar function and disposed, as previously mentioned, at another point in the system and/or to omit line 47 and valve 48 through which cooled catalyst may be returned directly to the regenerator. These features will be unnecessary when the endothermic conversion step conducted in reactor 1 and the exothermic regenerating operation conducted in regenerator 9 are substantially balanced thermally so that the combustibles deposited on the catalyst in the reactor and burned therefrom in the regenerator store in the regenerated catalyst returned to the reactor all or that portion of the endothermic heat of reaction which it is desired to impart to the reactants within the reactor. However, use of the catalyst cooler, as well as provision for returning cooled regenerated catalyst directly to the regenerator, will lend greater flexibility to the process with respect to choice of charging stock and operating conditions.

The preferred embodiment of the invention, illustrated and above described in conjunction with the drawing, is particularly advantageous in securing a pressure balance within the system to take advantage of gravity flow of the catalyst from the disengaging zone and hopper through the reactor, regenerator and interconnecting lines and stripping vessels while obtaining return of the catalyst through line 11 to the disengaging zone by the gas-lift action of outgoing products of regeneration. As an illustration, assuming that the reactants and fluid conversion products encounter a pressure drop of approximately five pounds in passing through the reactor and approximately the same pressure drop is encountered by the oxidizing gas and resulting combustion gases in passing through the regenerator and that a gas pressure of approximately five pounds gauge is employed in the disengaging zone, oxidizing gas may be supplied to the regenerator through line 27 and valve 28 at an inlet pressure of approximately fifteen pounds gauge. This will give a pressure of approximately ten pounds gauge for the gaseous products of regeneration entering transfer line 11. The reactants may be supplied to reactor 5 through line 12 and valve 13 at a gauge pressure of approximately ten pounds and fluid conversion products will be discharged from the reactor through line 17 and valve 18 at a pressure of approximately five pounds gauge.

Under the conditions above given, hydrostatic pressure on the relatively dense stream or column of catalyst entering the reactor will be somewhat greater than the gas pressure above bed 15 in the reactor so that the vaporous and gaseous conversion products will not pass upwardly through conduit 4, but will be discharged through line 17 and valve 18. Also, the hydrostatic pressure on the relatively dense stream or column of catalyst entering the regenerator is somewhat greater than the gas pressure in the regenerator above bed 26 so that the gaseous products of regeneration will not flow upwardly through conduit 8, but will be discharged through line 32.

Of course, the figures above given are not absolute values which must be used, but merely indicate relative values which may be advantageously employed at different points in the system. With relative gas pressures of the order above mentioned, the required height of the catalyst column above the reactor and above the regenerator is minimized with the result that the overall height of the structure can be kept at a minimum.

The example above given neglects consideration of the stripping columns 3 and 7, but when these vessels are used it will be apparent that the gas pressures above given may be adjusted to compensate for the drop in pressure encountered by the stripping gas in passing through the stripping zones. When stripping columns 3 and 7 are employed, as is usually desirable, I further contemplate making conduits 4 and 8 sufficiently long and of sufficiently smaller cross-section than the stripping columns that the stripping gas would encounter more resistance in flowing downwardly with the catalyst through conduits 4 and 8 than in flowing upwardly through the catalyst beds in the respective stripping columns. This minimizes introduction of stripping gas from line 39 into the reactor and introduction of stripping gas from line 20 into the regenerator. Conduit 6 is also of sufficient length that stripping gas will be discharged from the space above bed 19 in column 7 through line 24 rather than pass upwardly into the reactor through conduit 6.

The catalyst or contact material employed in the present process is preferably in the form of small substantially spherical particles. The size of the solid particles, whether spherical or of other regular or irregular shape, is sufficient that they will not be excessively compacted to give a high pressure drop for the fluids which are passed in contact therewith when beds of substantial depth are employed in the reaction, regenerating and stripping zones. However, their size or, more particularly, their average density is not sufficiently great to hinder their ready transportation by gas-lift. For example, with spherical particles of cracking catalyst consisting predominantly of silica and one or more metal oxides, such as alumina, zirconia, magnesia and the like, I have found that a suitable particle size is from 2 to 4 mm. average diameter.

In employing spherical or other granular solid particles, as provided by the invention, the presence in the beds of substantial quantities of excessively fine particles of a powdery or dusty nature should be avoided so that these small particles will not excessively fill the voids between the larger particles and give a high pressure drop for the reactants and regenerating gases passing through the beds. For this reason, the particles charged to the system are preferably of substantially uniform or well graded size and any excessive quantity of fines produced by attrition of the larger particles within the system is preferably removed from the system and replaced by larger particles. To avoid excessive attrition the particles should have good structural strength. The use of substantially spherical particles will also greatly assist in avoiding excessive attrition.

One suitable method of preparing spherical or substantially spherical synthetic catalysts of the type which may be advantageously used in the present process is disclosed in application Serial Number 516,392 of Glenn M. Webb and Reno W. Moehl, filed December 31, 1942.

I claim:

1. A conversion process which comprises contacting hydrocarbons at conversion temperature with subdivided solid catalyst in a reaction zone, removing contaminated catalyst particles from said zone and burning contaminants therefrom in contact with oxygen-containing gas in a regenerating zone maintained under pressure, separately removing resultant combustion gases and regenerated catalyst particles from the regenerating zone, suspending the withdrawn regenerated particles in at least a portion of said combustion gases, passing the resultant suspension through a cooling zone, introducing the cooled suspension into a separating zone disposed at a higher elevation than said reaction zone and maintained under lower pressure than the regenerating zone, the pressure differential between said regenerating and separating zones being such as to impart to said combustion gases sufficient kinetic energy to effect said transportation of the regenerated catalyst particles from the regenerating zone to the separating zone, separating catalyst particles from the combustion gases in the last-named zone, supplying a portion of the cooled regenerated catalyst directly from said separating zone to the regenerating zone without passage thereof through the reaction zone, and passing another portion of the regenerated catalyst downwardly by gravity from the separating zone to the reaction zone.

2. The process as defined in claim 1 further characterized in that the separating zone is disposed at a higher elevation than the regenerating zone and in that the regenerated catalyst particles are transported thereto by the gas-lift action of combustion gases from the regenerating zone.

3. The process as defined in claim 1 further characterized in that the reaction zone and the regenerating zone are disposed in vertical alignment and the catalyst passed downwardly therethrough in the form of an uninterrupted relatively dense column.

4. The process as defined in claim 1 further characterized in that the suspension of regenerated catalyst in combustion gases is cooled by indirect heat exchange with a cooling fluid, whereby to recover heat from both the catalyst and the combustion gases.

5. A conversion process which comprises contacting hydrocarbons at conversion temperature with subdivided solid catalyst in a reaction zone, removing contaminated catalyst particles from said zone and burning contaminants therefrom in contact with oxygen-containing gas in a regenerating zone, separately removing resultant combustion gases and regenerated catalyst particles from the regenerating zone, suspending the withdrawn regenerated particles in at least a portion of said combustion gases, passing the resultant suspension through a cooling zone, introducing the cooled suspension into a separating zone disposed at a higher elevation than said reaction zone, separating catalyst particles from the combustion gases in said separating zone, supplying a portion of the cooled regenerated catalyst directly from said separating zone to the regenerating zone without passage thereof through the reaction zone, and passing another portion of the regenerated catalyst by gravity from the separating zone to the reaction zone.

CLARENCE G. GERHOLD.